US012394329B2

(12) United States Patent
Martinez

(10) Patent No.: US 12,394,329 B2
(45) Date of Patent: Aug. 19, 2025

(54) SYSTEMS AND METHODS FOR REMOTE COLLABORATIVE REALTIME LEARNING

(71) Applicant: Luis F. Martinez, Miami, FL (US)

(72) Inventor: Luis F. Martinez, Miami, FL (US)

( * ) Notice: Subject to any disclaimer, the term of this patent is extended or adjusted under 35 U.S.C. 154(b) by 1630 days.

(21) Appl. No.: 15/898,063

(22) Filed: Feb. 15, 2018

(65) Prior Publication Data
US 2018/0247551 A1   Aug. 30, 2018

Related U.S. Application Data

(60) Provisional application No. 62/463,846, filed on Feb. 27, 2017.

(51) Int. Cl.
G09B 7/02        (2006.01)
A63F 13/87       (2014.01)
G09B 5/10        (2006.01)

(52) U.S. Cl.
CPC .................. G09B 7/02 (2013.01); G09B 5/10 (2013.01); *A63F 13/87* (2014.09)

(58) Field of Classification Search
CPC .............. G09B 7/02; G09B 5/10; A63F 13/87
See application file for complete search history.

(56) References Cited

U.S. PATENT DOCUMENTS

| | | | | |
|---|---|---|---|---|
| 5,344,326 A * | 9/1994 | Ferris | ....................... | G09B 5/10 434/350 |
| 6,292,830 B1 * | 9/2001 | Taylor | .................... | G06N 5/043 709/224 |
| 8,200,527 B1 * | 6/2012 | Thompson | ............. | G06Q 30/00 705/7.41 |
| 9,064,232 B2 * | 6/2015 | Laine | ...................... | G09B 19/00 |
| 10,540,906 B1 * | 1/2020 | Fieldman | ............ | H04L 12/1822 |
| 11,582,172 B2 * | 2/2023 | Miranda | ................. | H04L 51/04 |
| 11,636,351 B2 * | 4/2023 | Rosenberg | ............. | G06N 20/10 715/753 |
| 2006/0147882 A1 * | 7/2006 | Sambucetti | ............ | G09B 19/00 434/219 |
| 2008/0003559 A1 * | 1/2008 | Toyama | ................... | G09B 7/02 434/350 |
| 2009/0098524 A1 * | 4/2009 | Walton | ..................... | G09B 5/14 434/350 |
| 2010/0028846 A1 * | 2/2010 | Cohen | ...................... | G09B 5/00 434/323 |
| 2010/0279266 A1 * | 11/2010 | Laine | ...................... | G09B 5/10 434/350 |
| 2012/0256822 A1 * | 10/2012 | Coda | ....................... | G09B 5/12 345/156 |

(Continued)

OTHER PUBLICATIONS

Rosanna E. Guadagno, Robert B. Cialdini, Online persuasion: An examination of gender differences in computer-mediated interpersonal influence, Group Dynamics Theory Research and Practice, Mar. 2002, 36-51, 6-1, American Psychological Association Div. 49, Washington, D.C.

(Continued)

*Primary Examiner* — Xuan M Thai
*Assistant Examiner* — Sadaruz Zaman

(57) ABSTRACT

The invention creates a convenient environment and protocol for real-time collaborative learning and development ultimately leading to quantitative, role-based feedback at an individual and collective level to produce positive interdependence between a plurality of users.

8 Claims, 11 Drawing Sheets

Questions

Say what?
100 Points

1. Please identify the biggest opportunity missed by Joe.
   ○ Joe could have asked more questions to express understanding. ✎×
   ○ Joe could have paused for 3 seconds to express careful consideration. ✎×
   ○ Joe could have repeated back what he heard to show he was listening. ✎×
   ○ Joe could have explained how he planned to get through his busy schedule to make himself relatable. ✎×

There's always more
100 Points

2. What is the best technique to convey full understanding of stanley's communication?
   ○ Joe can express understanding of the emotion he senses associated with the situation. ✎×
   ○ Joe can ensure that every fact covered by stanley is repeated in full. ✎×
   ○ Joe can nod his head in agreement after each individual point. ✎×
   ○ Joe can provide a detailed Entanglement
200 Points 3. Which of the following would be the best example effective team communication between the parties?
   ○ Susy could explain to Paul how she plans to execute with customer. Paul can agree or desagree. ✎×
   ○ Susy could discuss with customer about their problems and relay feedback to paul. ✎×
   ○ Susy should paraphrase, create clarity and perception check Paul's message until

(56) References Cited

U.S. PATENT DOCUMENTS

| | | | |
|---|---|---|---|
| 2013/0171594 A1* | 7/2013 | Gorman | G09B 5/00 434/219 |
| 2013/0226674 A1* | 8/2013 | Field | G06Q 50/20 705/7.38 |
| 2014/0057240 A1* | 2/2014 | Colby | G09B 7/02 434/350 |
| 2014/0087351 A1* | 3/2014 | Huppenthal | G09B 7/00 434/350 |
| 2014/0120511 A1* | 5/2014 | Hall | G09B 5/02 434/350 |
| 2014/0154659 A1* | 6/2014 | Otwell | G09B 5/02 434/365 |
| 2014/0272893 A1* | 9/2014 | Rozycki | G09B 7/02 434/350 |
| 2014/0335485 A1* | 11/2014 | Dasgupta | G09B 19/00 434/219 |
| 2015/0037779 A1* | 2/2015 | Kobayashi | G09B 7/02 434/350 |
| 2015/0170535 A1* | 6/2015 | Negash | G09B 5/08 434/350 |
| 2015/0269525 A1* | 9/2015 | Hazy | G06Q 10/0639 434/237 |
| 2017/0018200 A1* | 1/2017 | Nemire | G09B 5/065 |
| 2018/0247551 A1* | 8/2018 | Martinez | G09B 5/10 |
| 2020/0302817 A1* | 9/2020 | Williams | G09B 7/02 |

OTHER PUBLICATIONS

Matt Bower, Barney Dalgarno, Gregor E. Kennedy, Mark J.W. Lee, Jacqueline Kenney, Design and implementation factors in blended synchronous learning environments: Outcomes from a crose-case analysis, Computers & Education, Aug. 2015, 1-17, 86, Elsevier, Amsterdam, Netherlands.

Stefan Hrastinski, Christina Keller, Sven A. Carlsson, Design exemplare for synchronous e-learning: A design theory approach, Computers & Education, Sep. 2010, 652-662, 55-2, Elsevier, Amsterdam, Netherlands.

Bas Giesbers, Bart Rienties, Dirk Tempelaar, Wim Gijselaers, A dynamic analysis of the interplay between asynchronous and synchronous communication in online learning: The impact of motivation, Journal of Computer Assisted Leeming, Jan. 1, 2014, 30-50, 30-1, Blackwell Science, Oxford, UK.

Hung Wei Tseng, Hsin-Te Yeh, Team members' perceptions of online teamwork learning experiences and building teamwork trust: A qualitative study. Computers & Education, Apr. 2013, 1-9, 63, Elsevier, Amsterdam, Netherlands.

Steven R. Conn, Richard L. Roberts, Barbara M. Powell, Attitudes and Satisfaction with a Hybrid Model of Counseling Supervision, Journal of Educational Technology & Society, Apr. 2009, 298-306, 12-2, International Forum of Educational Technology & Society.

Hayward P. Andres, The Impact of Communication Medium on Virtual Team Group Process, Information Resources Management Journal, Apr. 1-17, 2006, 19-2, Idea Group Pub., Hershey, PA.

Daniela Damian, Armin Eberlein, Brian Gaines, Mildred L. G. Shaw, An exploratory study of facilitation in distributed requirements engineering, Requirements Engineering, Feb. 2003, 23-31, Apr. 8, 2003, Springer-Verlag, London, UK.

Martin Wessner, Hans-Rudiger Pfister, Group formation in computer-supported collaborative learning, Group '01 Proceedings of the 2001 International ACM SIG Group Conference on Supporting Group Work, Sep. 30-Oct. 3, 2001, 24-31, ACM, New York, NY.

Rosanna E. Guadagno, Robert B. Cialdini, Online persuasion: An examination of gender differences in computer-mediated interpersonal influence, Group Dynamics Theory Research and Practice, Mar. 2002, 38-51, 6-1, American Psychological Association Div. 49, Washington, D.C.

Kyong-Jee Kim, Curtis J. Bonk, Cross-cultural Comparisons of Online Collaboration, Journal of Computer-Mediated Communication, Oct. 1, 2002, 8-1, Oxford University Press, Oxford, UK.

Andrea Tartaro, Justine Cassell, Playing with Virtual Peers: Bootstrapping Contingent Discourse in Children with Autism, Proceedings of the 8th International Conference for the Learning Sciences, 2008, 382-389, 2, International Society of the Learning Sciences.

Miriam Erez, Alon Lisak, Raveh Harush, Ella Glikson, Rikki Nouri, Efrat Shokef, Going global: Developing management students' cultural intelligence and global identity in culturally diverse virtual teams, Academy of Management Learning & Education, Nov. 2003, 330-355, 12-3, Briarcliff Manor, NY.

Candace Chou, A comparative content analysis of student interaction in synchronous and asynchronous learning networks, Proceedings of the 35th Hawaii International Conference on System Sciences, 2002, 1795-1803, Big Island, HI.

Rebecca English, Jennifer Duncan-Howell, Facebook © Goes to College: Using Social Networking Tools to Support Students Undertaking Teaching Practicum, Merlot Journal of Online Learning and Teaching, Dec. 2008, 596-601, 4-4, Multimedia Resource for Learning and Online Teaching, Los Alamitos, CA.

Matt Bower, Barney Dalgarno, Gregor E. Kennedy, Mark J.W. Lee, Jacqueline Kenney, Design and implementation factors in blended synchronous learning environments: Outcomes from a cross-case analysis, Computers & Education, Aug. 2015, 1-17, 86, Elsevier, Amsterdam, Netherlands.

Stefan Hrastinski, Christina Keller, Sven A. Carlsson, Design exemplars for synchronous e-learning: A design theory approach, Computers & Education, Sep. 2010, 652-662, 55-2, Elsevier, Amsterdam, Netherlands.

John Wiecha, Robin Heyden, Elliot Sternthal, Mario Merialdi, Learning in a Virtual World: Experience With Using Second Life for Medical Education, Journal of Medical Internet Research, Jan. 23, 2010, 12-1, JMIR Publications, Toronto.

Rebecca H. Rutherfoord, Using personality inventories to help form teams for software engineering class projects, Proceedings of the 6th annual conference on Innovation and technology in computer science education (ITICSE '01), 2001, 73-76, ACM, New York, NY.

Garry Falloon, Making the connection: Moore's theory of transactional distance and its relevance to the use of a virtual classroom in postgraduate online teacher education. Journal of Research on Technology in Education, 2011, 187-209, 43-3, Taylor & Francis, Philadelphia, PA.

Bas Giesbers, Bart Rienties, Dirk Tempelaar, Wim Gijselaers, A dynamic analysis of the interplay between asynchronous and synchronous communication in online learning: The impact of motivation, Journal of Computer Assisted Learning, Jan. 1, 2014, 30-50, 30-1, Blackwell Science, Oxford, UK.

Florence Martin, Michele A. Parker, Deborah F. Deale, Examining Interactivity in Synchronous Virtual Classrooms, The International Review of Research in Open and Distributed Learning, Jun. 2012, 227-261, 13-3, Athabasca University Press, Athabasca, AB.

Catherine Durnell Cramton, Kara L. Orvis, Jeanne M. Wilson, Situation invisibility and attribution in distributed collaborations, Journal of management, Aug. 2007, 525-546, 33-4, Sage Publications, Thousand Oaks, CA.

Timothy Wedig, Getting the most from classroom simulations: Strategies for maximizing learning outcomes, PS: Political Science & Politics, Jun. 30, 2010, 547-555, 43-3, Cambridge University Press for the American Political Science Association, New York, NY.

Raymond Chiong, Jelena Jovanovic, Collaborative learning in online study groups: An evolutionary game theory perspective, Journal of Information Technology Education, 2012, 81-101, 11, Informing Science Institute, Santa Rosa, CA.

Hung Wei Tseng, Hsin-Te Yeh, Team members' perceptions of online teamwork learning experiences and building teamwork trust: A qualitative study, Computers & Education, Apr. 2013, 1-9, 63, Elsevier, Amsterdam, Netherlands.

W. Randall Thomas, S. Kim Macgregor, Online project-based learning: How collaborative strategies and problem solving processes impact performance, Journal of Interactive Learning Research, Jan. 1, 2005, 83-107, 16-1, Association for the Advancement of Computing in Education (AACE), Waynesville, NC.

Steven R. Conn, Richard L. Roberts, Barbara M. Powell, Attitudes and Satisfaction with a Hybrid Model of Counseling Supervision,

(56) References Cited

OTHER PUBLICATIONS

Journal of Educational Technology & Society, Apr. 2009, 298-306, 12-2, International Forum of Educational Technology & Society.

Hayward P. Andres, The Impact of Communication Medium on Virtual Team Group Process, Information Resources Management Journal, Apr. 2006, 1-17, 19-2, Idea Group Pub., Hershey, PA.

Keri K. Stephens, Timothy P. Mottet, Interactivity in a web conference training context: Effects on trainers and trainees, Communication Education, Dec. 18, 2008, 88-104, 57-1, Taylor & Francis for the National Communication Association, Philadelphia, PA.

Daniela Damian, Armin Eberlein, Brian Gaines, Mildred L. G. Shaw, An exploratory study of facilitation in distributed requirements engineering, Requirements Engineering, Feb. 2003, 23-41, Apr. 8, 2003, Springer-Verlag, London, UK.

Saniye Tugba Bulu, Zahide Yildirim, Communication behaviors and trust in collaborative online teams, Journal of Educational Technology & Society, Jan. 2008, 132-147, 11-1, International Forum of Educational Technology & Society.

Nancy J. Maushak, Chaohua Ou, Using synchronous communication to facilitate graduate students' online collaboration, Quarterly Review of Distance Education, 2007, 161-169, 8-2, Information Age Pub., Greenwich, CT.

Jeffrey H. Kuznekoff, Lindsey M. Rose, Communication in multiplayer gaming: Examining player responses to gender cues, 2013, 541-556, 15(4), New Media & Society.

S. Knaak, S. Patten, A Grounded Theory Model for Reducing Stigma in Health Professionals in Canada, Acta Psychiatrica Scandinavica, 134 (2016): 53-62.

Mike McLinden, Steve McCall, Danielle Hinton, Annette Weston, Participation in Online Problem-based Learning: Insights from Postgraduate Teachers Studying through Open and Distance Education, Distance Education, 2006, 27-3, 331-53.

Elena De La Guia, Vincente Lopez Camacho, Luis Orozco-Barbosa, Victor M. Brea Lujan, Victor M. R. Penichet, Maria Lozano Perez, Introducing IoT and Wearable Technologies into Task-Based Language Learning for Young Children, IEEE Transactions on Learning Technologies, vol. 9, No. 4, pp. 366-378, 1 Oct.-Dec. 2016.

Laurie Williams, D. Scott McCrickard, Lucas Layman, Khaled Hussein, Eleven Guidelines for Implementing Pair Programming in the Classroom, Agile 2008 Conference, Toronto, ON, 2008, pp. 445-452.

Jonathan Kanter, Mavis Tsai, Gareth Holman, Kelly Koerner, Preliminary Data From a Randomized Pilot Study of Web-Based Functional Analytic Psychotherapy Therapist Training. Psychotherapy (Chicago, Ill.), 2012.

Colleen Aalsburg Wiessner, Leia Gonzalez Sullivan, New Learning: Constructing Knowledge in Leadership Training Programs, Community College Review 35.2 (2007): 88-112.

Mark Adkins, Michael Burgoon, Jay F Nunamaker, Using Group Support Systems for Strategic Planning with the United States Air Force, Decision Support Systems 34.3 (2002): 315-37.

Nina Wong Sarver, Deborah C. Beidel, Josh Spitalnick, The feasibility and acceptability of virtual environments in the treatment of childhood social anxiety disorder, J Clin Child Adolesc Psychol. 2014;43(1):63-73.

Anne Haugen Gausdal, Trust-building Processes in the Context of Networks, Journal of Trust Research, 2.1 (2012): 7-30.

* cited by examiner

Category

Title

Points

Time (in Seconds)

Description

Objectives

Documentation [Choose Files] No file chosen

Image [Choose Files] No file chosen

[Create Activity]

Fig. 1

| Communication Staging | |
|---|---|
| Individual Time | |
| Group Time | |
| Individual Description | This will get you ready for the subject matter with a 15 minute blast of content where you will be quizzed. |
| Group Description | This will get you ready for the subject matter and how to work well as team (as you are expected to work day to day). |
| Environment Description | In our line of work, safety and quality depend on effective communication. |
| Goals Description | Understand what are the situations where effective communication often breaks down. |

Fig. 2

Minimum Staging Score

[ Save ]

Staging Questions

Environment +

50 Points

✎

Video Link ✎×→

1. Listening is so important because it not only allows us to absorb the message but also does what two things between parties?

○ Builds trust and selfesteem. ✎×
○ Creates trust and understanding. ✎×
○ Builds camaraderie and effectiveness. ✎×
○ Creates efficiency and reliability. ✎×

50 Points

✎

Video Link ✎×←

1. What method best helps a listener avoid interruption, show careful consideration, and better understanding?

○ Paraphrase ✎×
○ Closed Loop Communication ✎×
○ 3 Second pause ✎×
○ Perception checking ✎×

[ Add Answer ]

Fig. 3

Questions

✎
Say what?
100 Points

Video Link

| | Stanley had a rough day. He arrives at Joe's desk with a story to tell. He's |

[Choose Files] No File Chosen
Save  ✎ × →

1. Please identify the biggest opportunity missed by Joe.
   ○ Joe could have asked more questions to express understanding. ✎ ×
   ○ Joe could have paused for 3 seconds to express careful consideration. ✎ ×
   ○ Joe could have repeated back what he heard to show he was listening. ✎ ×
   ○ Joe could have explained how he planned to get through his busy schedule to make himself relatable. ✎ ×

✎
There's always more
100 Points

Video Link

| | Stanley arrives at Joe's desk with a story of tell. He's seemingly anxious stanley explains |

[Choose Files] No File Chosen
Save  ✎ × ↔

2. What is the best technique to convey full understanding of stanley's communication?
   ○ Joe can express understanding of the emotion he senses associated with the situation. ✎ ×
   ○ Joe can ensure that every fact covered by stanley is repeated in full. ✎ ×
   ○ Joe can nod his head in agreement after each individual point. ✎ ×
   ○ Joe can provide a detailed ✎
Entanglement
200 Points

Video Link

| | Paul And Susy worked together often. They were successful executing multiple |

[Choose Files] No File Chosen
Save  ✎ × ↔

3. Which of the following would be the best example effective team communication between the parties?
   ○ Susy could explain to Paul how she plans to execute with customer. Paul can agree or desagree. ✎ ×
   ○ Susy could discuss with customer about their problems and relay feedback to paul. ✎ ×
   ○ Susy should paraphrase, create clarity and perception check Paul's message until

SYSTEMS AND METHODS FOR REMOTE COLLABORATIVE REALTIME LEARNING

CROSS REFERENCE TO RELATED APPLICATIONS

This application claims priority to and the benefit of U.S. Provisional Application No. 62/463,846, filed Feb. 27, 2017, which is hereby incorporated by reference in its entirety.

FEDERALLY SPONSORED RESEARCH OR DEVELOPMENT

None.

TECHNICAL FIELD

The present invention relates to systems and methods for remote collaborative real-time learning and development activities. The invention further provides the ability to create an environment for real-time collaborative activities, execute real-time collaborative activities and produce quantitative, role-based feedback at the individual and collective team level.

BACKGROUND

Online social learning solutions collect users, learners or participants into an online room or environment, where they engage with materials or activities as individuals. The users partake in a shared online setting and collaborate to piece together answers, activities or project solutions. They subsequently discuss their individual interactions with the materials or activities as a separate, collective activity. In other interactive learning environments, individual users interact with material and are provided an environment where feedback and collaboration are available in real-time through a shared network, yet still as a separate activity than the individual interaction with materials or problems.

There are online team-based learning solutions that operate much in the same way as online social learning. Essentially, a specific process is followed. First, individuals review material online or in a live setting. Second, individuals take a short quiz or test typically called "Individual Readiness Assurance Test" (iRAT). Next, team readiness assurance tests (tRATs) are executed. During tRATs, users come to a consensus on a question or problem and submit a single answer. Instead of the technology providing an environment to duplicate a physical setting, where a plurality of users share their thoughts or opinions in real-time to reach said consensus, current team-based learning technologies do not execute real-time collaboration online. Fourth, an application exercise, where users apply the knowledge they have attained during the iRat and tRat steps, is completed by the team.

Currently there is not a real-time collaboration solution creating true interconnectedness available. The options currently available fail to ensure real-time collaboration in a systematic format and one that guarantees at least minimal engagement from each participant of a team in a collaborative activity. Additionally, solutions do not contemplate role-based feedback—both individual and collective feedback based on the execution of the collaborative activity.

While real-time technology has already been used for applications like chat, that technology has not been applied to a collaborative learning or development activity and placed into a specific protocol to ensure at least minimal participation in group portions of a collaborative activity, as well as produce role-based, individual and collective team feedback. Doing so would create a process or protocol for positive interdependence among participants.

Known systems and methods for collaborative learning have substantial failings.

Some known systems rely on a shared display, where it would be preferable to provide a collaborative learning system and method that enables users or learners to have their own, different devices. Others rely on real-time technology to produce feedback, yet do not contemplate the requirement of collaboration between users to complete activities and receive quantitative feedback.

Other systems and methods for collaborative learning fail to provide the ability to customize collaborative activities or require real-time collaboration on an assigned problem, question or task.

SUMMARY

The present invention is a platform created to leverage collaboration of multiple users and guarantee at least minimum level engagement from each participant while executing a collaborative activity for a variety of benefits (e.g. learning). The process is contemplated to produce positive interdependence between users to optimize the objective of a given activity. Depending on role, users can login to their account, create collaborative activities, invite other users to activities or have activities assigned to them. Users then execute those activities with at least 1 other team member to learn more, be more engaged in the topic, understand how the topic applies to them more easily and understand the context of collaboration for applying the knowledge. Finally, these structured interactions between users serve as the basis for role-based feedback at both the individual and collective levels available in real-time.

BRIEF DESCRIPTION OF THE DRAWINGS

For a fuller understanding of the nature of the present invention, reference should be given to the following detailed description taken in connection with the accompanying drawings in which:

FIGS. 1-11 depict exemplary interfaces in accordance with one or more embodiments.

Like reference numerals refer to like parts throughout the several views of the drawings.

Figure 5:
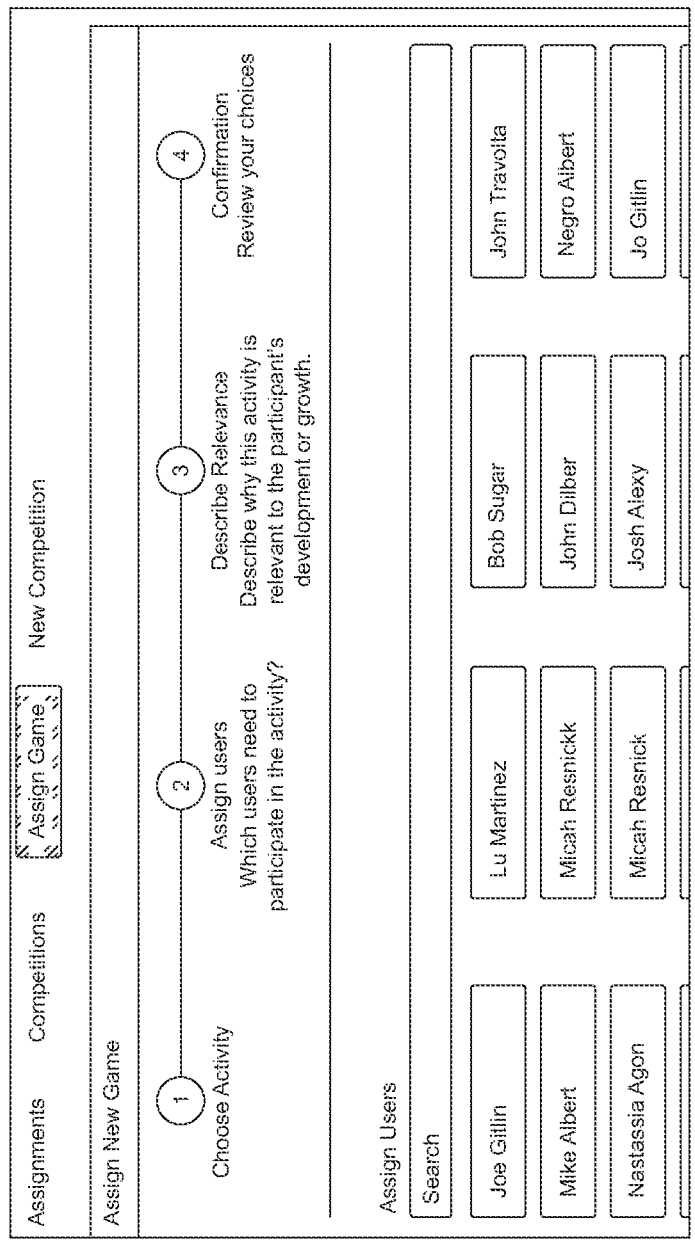

While one or more embodiments may be susceptible to various modifications and alternative forms, specific embodiments thereof are shown by way of example in the drawings and will herein be described in detail. It should be understood, however, that the drawings and detailed description thereto are not intended to limit the disclosure to the particular form disclosed, but to the contrary, the disclosure is to cover all modifications, equivalents and alternatives falling within the spirit and scope of this disclosure.

DETAILED DESCRIPTION

The present invention provides an environment where users interact in a structured collaborative activity in real-time and receive immediate individual and collective team feedback.

The invention allows creators of collaborative activities to easily produce a setting that requires at least minimal participation from each user in the collaborative portions of the activity. This requirement guarantees positive interdependence between an activity's users. The invention eliminates the need for users to join in a physical space to receive the benefits of real-time discourse that ultimately results in beneficial role-based, individual and collective feedback. These structured collaborative settings guarantee at least minimal engagement in topics. Users learn or benefit more from leveraging the plurality of participants and, most importantly, understand real world applications of subject matters that can be optimized through collaboration. The collaborative activities transition learning and development opportunities from passive to active, while making it convenient, genuinely collaborative in real-time and highlighted with the personal benefits of feedback according to user roles.

Team-based learning has been done in a physical setting for some time. Even so, it is often difficult, if not impossible, to capture the real-time discourse of teams as they solve problems. Further, while the team-based activities lend themselves and encourage all members to collaborate in problem-solving, the structure of the problems themselves do not guarantee at least minimum level participation from each member of the team. This fails to optimize the benefits of positive interdependence among members of a collaborative activity. Online social learning has recently begun to grow in popularity and use. Real-time technology using websockets to listen to online events and essentially receive notifications and actions without having to request for a new online page has been used in other settings and for separate purposes. Until now, these parts have yet to be synthesized into a structured online process that also requires each member participate in order to move the process forward. The synthesis affords users a "greater whole" in terms of benefit. Namely, going through the structured collaborative process requires users the guarantee of minimum level engagement and, most importantly, allows them to gain role-based, individual and collective feedback from the real-time, collaborative interactions themselves.

The best alternatives for leveraging multiple viewpoints currently available are versions of team-based learning, online social learning and versions of interactive learning. In team-based learning, to produce the real-time discourse that allows members to leverage multiple perspectives within their own team and on other teams, it mostly has to be done in a physical setting. This means collecting people into a room or environment and going through the structured process while experiencing some of its inherent gaps (e.g. difficult to capture collaborative interaction data). The current online versions of team-based learning do not contemplate real-time collaboration at the heart of leveraging multiple viewpoints and cannot guarantee a minimum level of member participation through the protocol.

Next, online social learning is a different, more disjointed process altogether than the present invention because users often interact with subject matter or problems as individuals and subsequently convene to collaborate on viewpoints or perspectives with the aim to learn more and receive feedback as a separate thread than the actual problem-solving process itself.

Finally, the alternatives revolving around interaction with a subject matter or problem and real-time collaboration with a facilitator (e.g. "teacher" or "coach") fail to leverage the opportunities from development, learning and feedback stemming directly from collaborative interactions.

Example of the Present Invention

1) Creation of Team Game—Patent Review

This is the creation of a team-based learning game. In the creation, there are specific things users can input that lead to automated guidance and feedback from the system.

As shown in FIGS. 1-4, a user is presented with a series of interfaces to input information or receive guidance to create a collaborative activity. The inputs can be designed to provide feedback to individual users or a talent developer or facilitator of the collaborative activity.

This creates an environment where users participating in the collaborative activity are required to be at least minimally engaged in the problem so the plurality (e.g. team) of users can move forward in their goal. In order to do so, the creator of the team game has to input certain parameters. Things like time allowed per section, minimum score, questions, scenarios, weight or point values, etc. These parameters work together to produce a collaborative activity where ultimately feedback is provided to the facilitator (e.g. "teacher" or "coach") and individual participants from both an individual accountability and a team accountability standpoints.

2) Team Game—Assignment and Execution

As shown in FIG. 5, assigning an activity goes in 4 steps: (1) Choose activity; (2) Assign Users; (3) Describe the relevance of the assignment; (4) Confirmation of selections.

Figure 6:

As shown in FIG. 6, once an activity is assigned, users are linked to a centralized workroom or environment. FIG. 6 is an example interface of a workroom or environment where users can see what steps they've completed and be linked to their scores.

Figure 7:
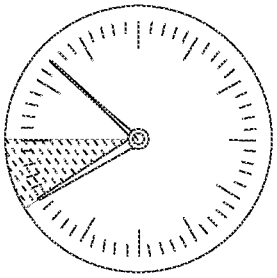

As shown in FIG. 7, Step 1 provides a set of questions or problems to each user to individually answer. In the context of a collaborative activity, this step exists to create individual accountability and a baseline of knowledge on the subject matter of the collaborative activity.

Step 2 provides the same set of questions that each user must individually answer in Step 1, but now users must collaborate via real-time chat on the specific question or problems. The plurality of users address aspects of each question. For example, users may challenge answer choices, which provides feedback to their participants. In other words, users must collaborate through problem together. Ultimately, the plurality of users must come to a consensus on one of the alternatives provided by the creator of the collaborative activity to move forward. This collaborative execution leverages various user viewpoints to optimize an understanding of the problem presented by the creator. Being placed in this scenario creates and optimizes positive interdependence.

The answers may be submitted against a timer. This uses real-time technology where users can experience the collaboration live as if they were in the same room talking. Answers submitted are displayed in real-time.

Step 3 requires the users to apply the content learned in Steps 1 and 2 to scenarios established by the activity creator, where collaboration would optimize performance. The users collaborate on the answers using real-time technology in the same way they do in Step 2.

Step 4 is peer evaluation as one of ordinary skill in the art would understand.

3) Team Game—Review and Feedback Features

As shown in FIGS. 8-11, the invention permits one to 1) create collaborative activities as opportunities for learning and development; 2) use those scenarios and testing to produce interactions between team members and multiple teams when there is a competition; and, 3) have the system provide feedback and guidance valuable to both individual participants and talent developers.

Figure 8:
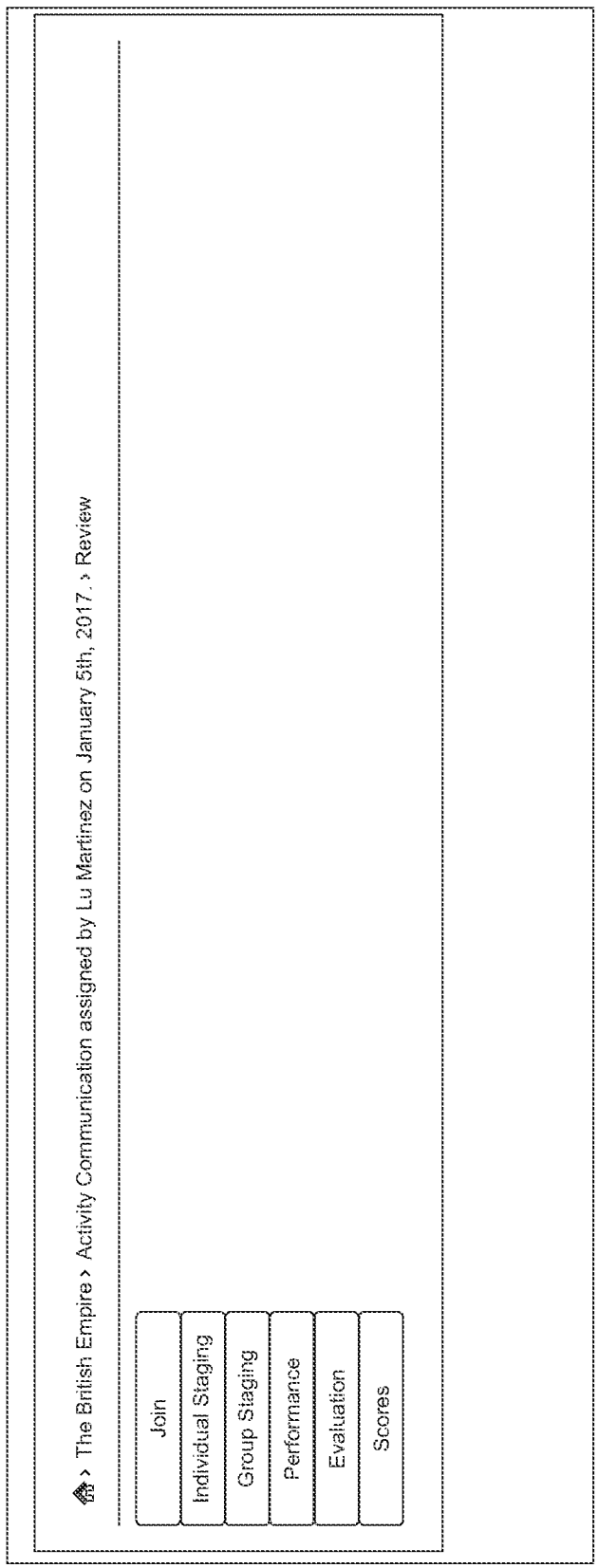

Review of a Team Game. As shown in FIG. 8, an area of the collaborative activity is linked in the workroom or environment. It serves both individual team members who have participated in the team game & the talent developer or assigner of the team activity.

Figure 9:
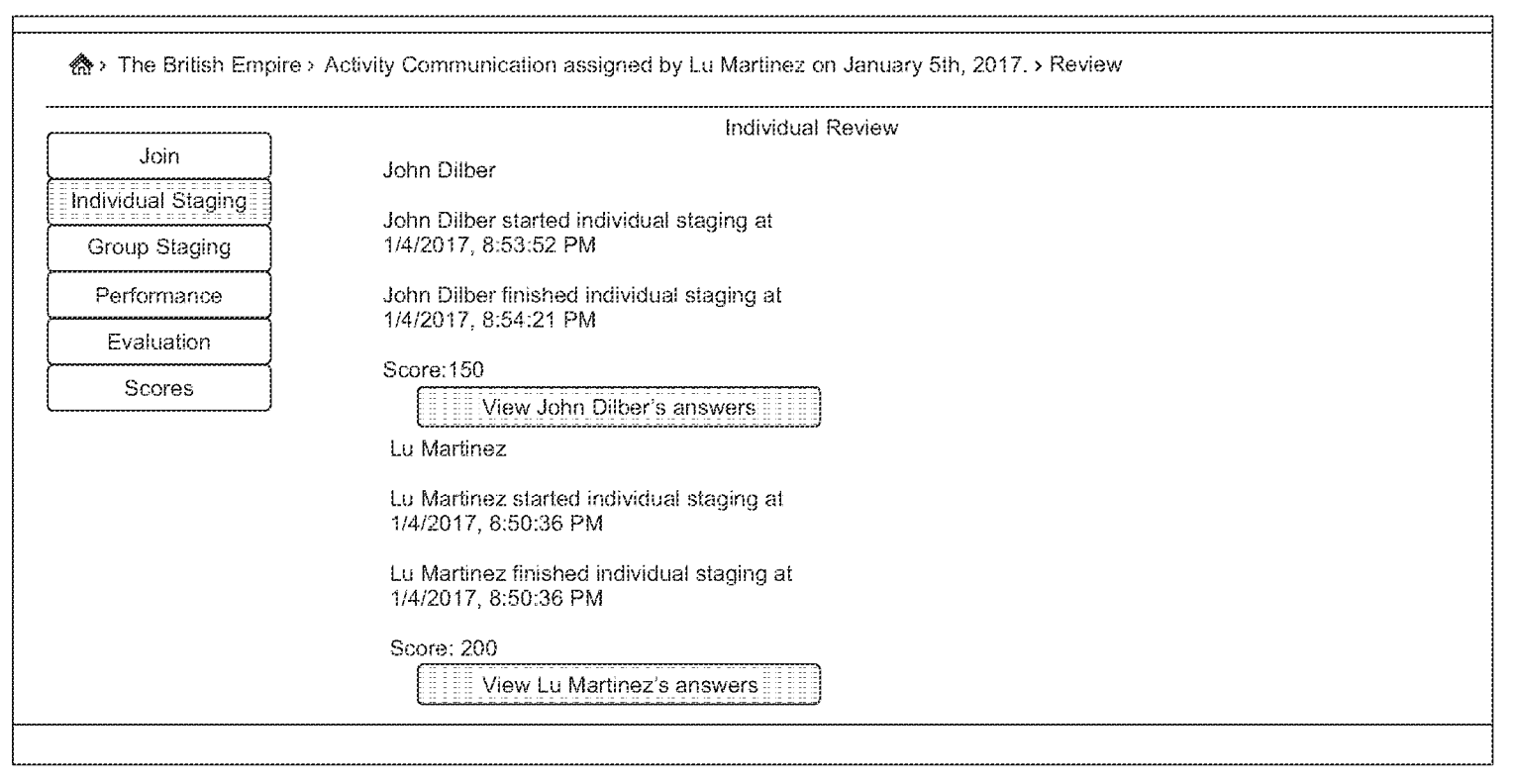

Individual (Step 1) Overview. As shown in FIG. 9, individuals can see their scores, receive feedback and guidance from the system, etc. Talent developers are able to see everyone's scores, receive feedback and guidance from the system, etc.

Group (Step 2) Overview. Individuals are able to see their previous interaction played back exactly as it happened, receive feedback and guidance from the system in real-time, etc. Talent developers are able to see how the collaboration occurred exactly as it happened, receive feedback and guidance from the system, etc. The system allows both individual and collective feedback based on interdependent interactions.

Performance (Step 3) Overview. Individuals are able to see their previous interaction in the performance stage played back exactly as it happened, receive feedback and guidance from the system in real-time, etc. Talent developers are able to see how the collaboration occurred in the performance stage exactly as it happened, receive feedback and guidance from the system, etc. The system allows both individual and collective feedback based on interdependent interactions.

Figure 10:
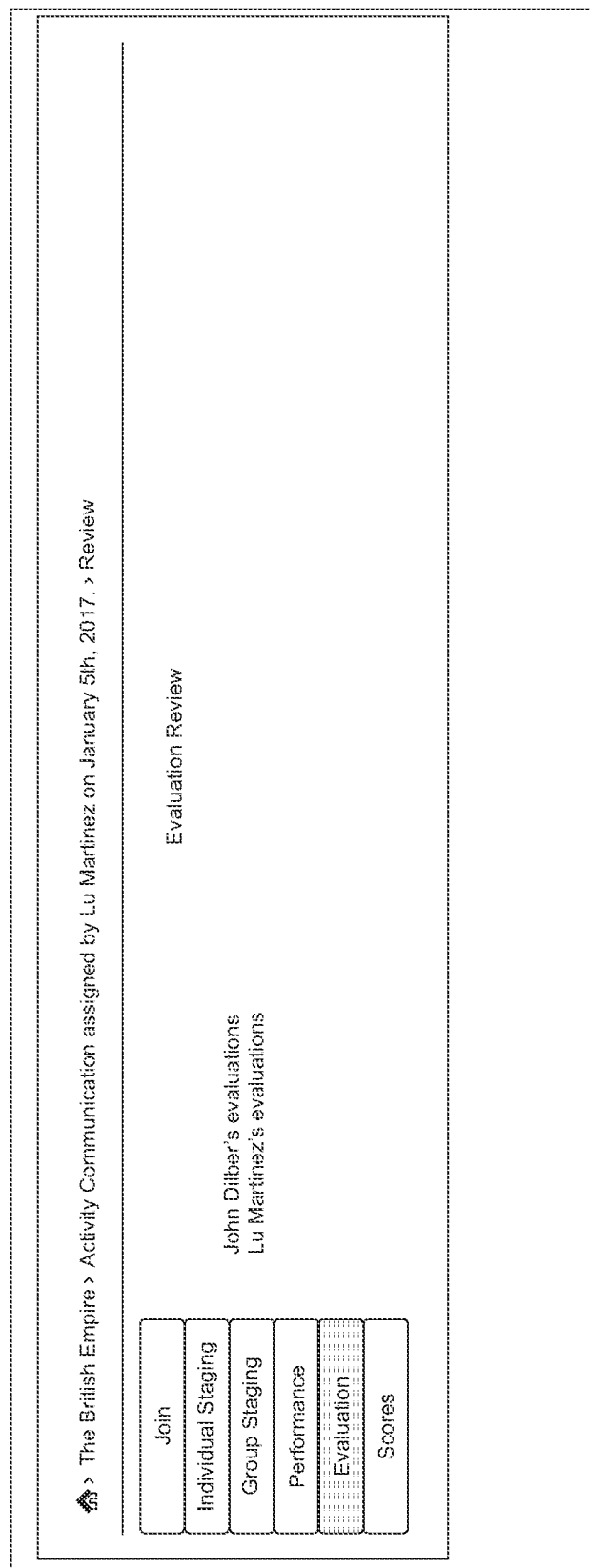

Peer Evaluation (Step 4) Overview. As shown in FIG. 10, individuals are able to see what they have been scored (an average) by other members who participated in the team game. Talent developers are able to see everyone's average score and other details to determine where there might be team interaction problems.

Figure 11:
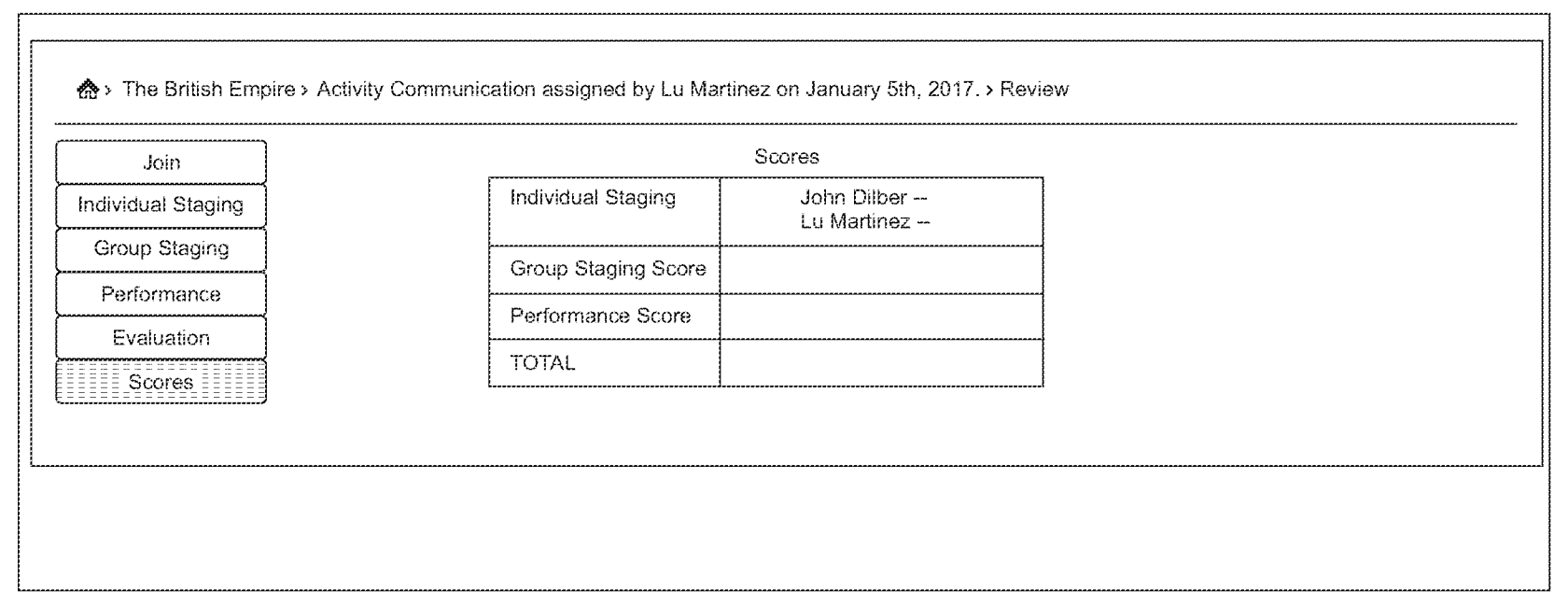

Scores Overview. As shown in FIG. 11, individuals are able to see what they've scored on the team game and receive feedback and guidance. Talent developers are able to see everyone's scores and able to provide feedback and guidance.

All publications and patent documents cited in this application are incorporated by reference in pertinent part for all purposes to the same extent as if each individual publication or patent document were so individually denoted. By citation of various references in this document, Applicants do not admit any particular reference is "prior art" to their invention. It is to be appreciated that the foregoing Detailed Description section, and not the Abstract section, is intended to be used to interpret the claims. The Abstract section may set forth one or more, but not all, exemplary embodiments of the present invention as contemplated by the inventor(s), and thus, is not intended to limit the present invention and the appended claims in any way.

The foregoing description of the specific embodiments should fully reveal the general nature of the invention so that others can, by applying knowledge within the skill of the art, readily modify and/or adapt for various applications such specific embodiments, without undue experimentation, without departing from the general concept of the present invention.

Moreover, the breadth and scope of the present invention should not be limited by any of the above-described exemplary and illustrative embodiments, but should similarly be defined only in accordance with the following claims and their equivalents.

Since many modifications, variations and changes in detail can be made to the described preferred embodiment of the invention, it is intended that all matters in the foregoing description and shown in the accompanying drawings be interpreted as illustrative and not in a limiting sense. Thus, the scope of the invention should be determined by the appended claims and their legal equivalents. From the foregoing, it will be seen that this application is one well adapted to attain all the ends and objects hereinabove set forth together with other advantages which are obvious and which are inherent to the structure.

It will be understood that certain features and sub-combinations are of utility and may be employed without reference to other features and sub-combinations. This is contemplated by and is within the scope of the claims.

What is claimed is:

1. A computer-implemented method for remote collaborative school learning and development comprising:
    creating on a server that provides remote access over a network a digital online structured school environment for collaborative learning and development by a plurality of users wherein each user is remote from the server and has their own non-transitory computer readable storage media device having processor executable instructions stored thereon, a graphical display, and a network connection to access the server providing remote access to the structured school environment;
    generating in the structured school environment a learning and development activity for the users that includes a graphical user interface comprising a collaborative aspect with a plurality of alternative choices;
    associating on the remote server over the network one of said alternative choices as a correct choice;
    providing from the remote server over the network the collaborative aspect to the devices of the users by displaying on the user devices the graphical user interface comprising the collaborative aspect;
    transmitting over the network between the remote server and the users communications within the structured school environment between the users regarding the aspect, wherein the communications are transmitted over the network to the server and to each of the user devices through websockets and displayed on the graphical user interface on each user device;
    receiving by the remote server over the network responses to the aspect from each user, wherein each user enters a response through the graphical user interface displayed on their device and wherein the responses are transmitted over the network to the server and to each of the other user devices through websockets and displayed on the graphical user interface on each user device;
    evaluating in the structured school environment the responses provided by the users;
    determining on the remote server whether all of the responses provided by the users are the associated correct choice to the collaborative aspect;
    generating in the structured school environment feedback for the users and providing said feedback from the structured school environment to the users;
    transmitting communications between the users regarding the aspect subsequent to receiving responses from each user; and, receiving a different response from at least one of the plurality of users;
    and, requiring all of the users provide the associated correct choice before permitting any user to proceed to a subsequent aspect in the learning and development activity.

2. The method of claim 1 wherein the collaborative aspect is provided to the users in real-time.

3. The method of claim 1 further comprising providing evaluation metrics to the users.

4. The method of claim 1 wherein the communications are transmitted in real-time.

5. The method of claim 2 further comprising providing evaluation metrics to the users.

6. The method of claim 2 wherein the communications are transmitted in real-time.

7. The method of claim 3 wherein the evaluation metrics are displayed in real-time.

8. The method of claim 5 wherein the evaluation metrics are displayed in real-time.

\* \* \* \* \*